UNITED STATES PATENT OFFICE.

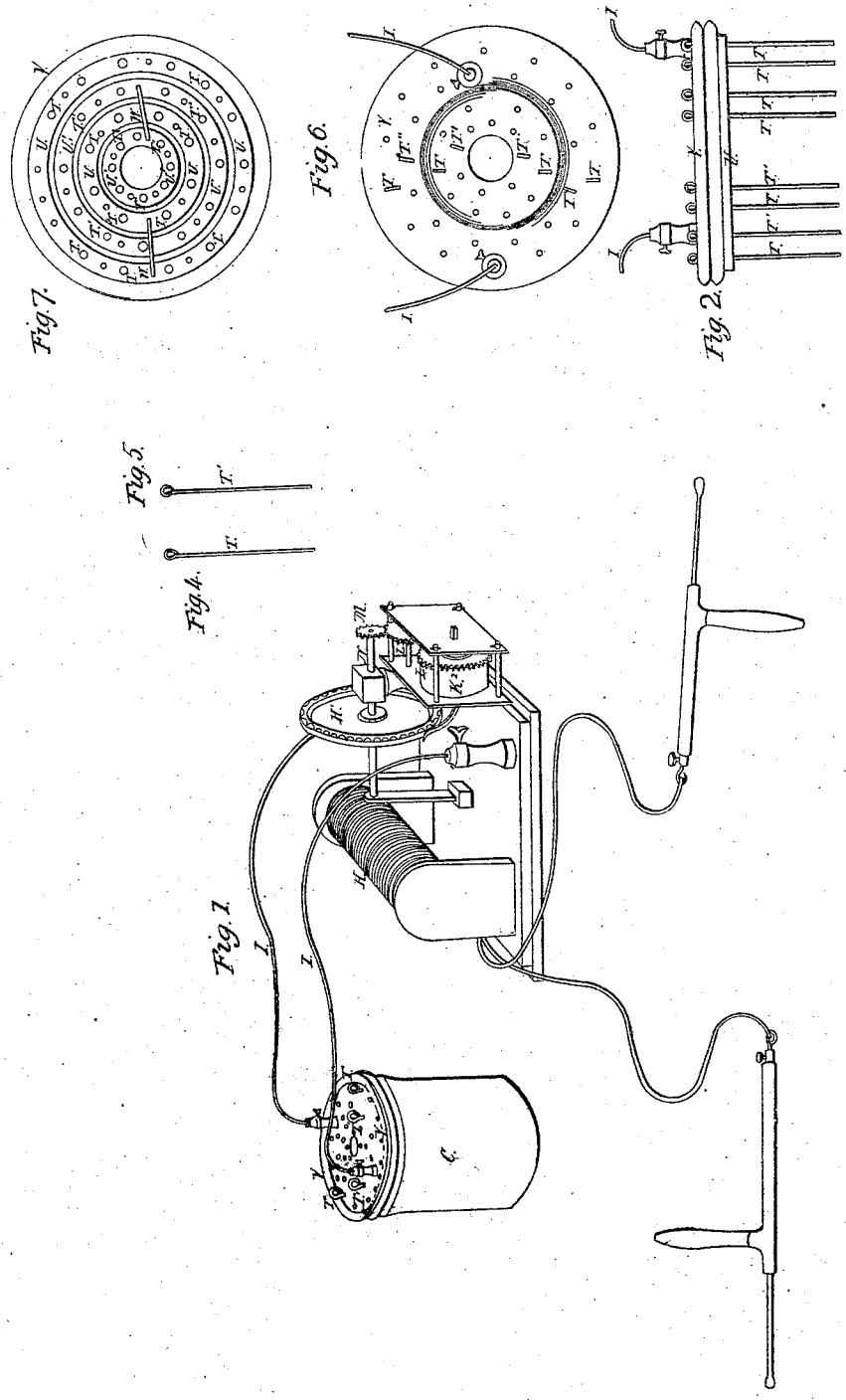

ADOLPHUS OLMSTEAD, OF EASTON, PENNSYLVANIA.

IMPROVEMENT IN GALVANIC BATTERIES.

Specification forming part of Letters Patent No. 6,362, dated April 17, 1849.

*To all whom it may concern:*

Be it known that I, ADOLPHUS OLMSTEAD, of the borough of Easton, in the county of Northampton and State of Pennsylvania, have invented a new and useful improvement in the hydro-galvanic electro-magnetic instrument for medicinal, chemical, philosophical, mechanical, and other purposes, called "Olmstead's Improved Voltaic Arrangement," which is described as follows, reference being had to the annexed drawings of the same, making part of this specification.

Figure 1 is a perspective view of the apparatus as arranged for operation. Fig. 2 is a side elevation of the shield, plates, studs, pins, &c. Fig. 4 is one of the copper pins detached from its circle. Fig. 5 is one of the zinc pins, also detached from its circle. Fig. 6 is a plan or top view of the galvanic battery. Fig. 7 is an inverted view of the same.

Similar letters in the several figures refer to corresponding parts.

The nature of my invention and improvement consists in forming a galvanic battery of concentric plates or rings U U', containing copper and zinc pins or plates, said rings U U' being of similar or dissimilar metals, arranged in alternate order and united by wires W. This galvanic battery is placed in a stationary cell, C, or reservoir, of glass or other suitable material, and is connected to an electro-magnetic battery, H, by conducting-wires I, in the usual way. The wheel H' of the electro-magnetic battery is turned by mechanical means instead of by hand.

The mechanism I generally employ consists of any of the known powers of motion, such as a coiled spring arranged in the box or cylindrical case K², and cogged wheels L or weights, &c., driving a train of wheels connected to a pinion, M, on the shaft N of the electro-magnetic wheel H'.

The galvanic battery for producing voltaic electricity for medical and other purposes is constructed of a series of perforated concentric metallic rings, U U', connected together by conducting-wires W, said rings being attached by screws or other means to a perforated cover or shield of wood, V, which is placed over the top of a galvanic trough, C, containing diluted sulphuric acid, through which cover and rings are introduced copper and zinc plates or pins, solid or tubular, forming a powerful battery, involving in its own formation a natural and perfect mode of graduation, giving at all times the operator the most entire control over the quantity of its influence by the addition or subtraction of the aforesaid pins or plates.

V is the shield; U U', the concentric rings screwed to the shield; W, the conducting-wires for connecting the brass rings, as represented in the drawings; T T', the copper and zinc pins; I I, the conducting-wires for connecting the galvanic battery with the magnetic battery.

The galvanic battery may also be formed of perforated metallic bars of similar or dissimilar metals, connected alternately by wires, as above described, through which copper and zinc plates or pins, solid or tubular, may be introduced to form the battery on the same principle as above stated, the pins or plates being increased in number to strengthen and diminished to reduce the battery.

Operation: Adjust the cover or shield over the top of a galvanic trough containing diluted sulphuric acid or other corroding liquid, the surface of the solution being about half an inch from the under side of the perforated plates attached to the shield, and the perforated plates being connected by conducting-wires to the magnetic battery, and the instrument otherwise properly adjusted, the operator will introduce through the apertures in the rings or bars copper and zinc pins or plates, forming a single voltaic pair in action. If the action be sufficient, the operator will proceed; but if too feeble another pair must be introduced, and so on until a sufficient action be obtained to produce the desired effect. If found to act too powerful, it must be reduced by withdrawing the pins or plates from the battery, which gives the operator at all times complete control over the action of the instrument, and does away with the ordinary modes of graduating the battery by raising and lowering the plates or elevating and depressing the acid solution in which the plates are immersed.

What I claim as my invention, and desire to secure by Letters Patent, is—

Constructing the battery with perforated rings or bars, through which are inserted tubular or solid pins or plates of zinc and copper, or other suitable metals, in the manner and for the purpose herein set forth, for producing voltaic electricity for medicinal and other purposes.

In testimony whereof I have hereunto subscribed my name before two subscribing witnesses.

AD. OLMSTEAD.

Witnesses:
WM. P. ELLIOT,
A. E. H. JOHNSON.